(12) United States Patent
Weeth et al.

(10) Patent No.: US 10,391,917 B2
(45) Date of Patent: Aug. 27, 2019

(54) PORTABLE TRANSITION DOCK FOR PALLETIZED PRODUCT

(75) Inventors: Frederic R. Weeth, Pacific Grove, CA (US); Michael J. Azzopardi, Salinas, CA (US); David K. Offerdahl, Salinas, CA (US); John S. Harlan, Salinas, CA (US)

(73) Assignee: Azzopardi Technology Group, LLC, Spreckels, CA (US)

(*) Notice: Subject to any disclaimer, the term of this patent is extended or adjusted under 35 U.S.C. 154(b) by 1410 days.

(21) Appl. No.: 13/252,875

(22) Filed: Oct. 4, 2011

(65) Prior Publication Data

US 2013/0084151 A1    Apr. 4, 2013

(51) Int. Cl.
*B65G 67/04* (2006.01)
*B60P 3/20* (2006.01)
*B60P 3/00* (2006.01)

(52) U.S. Cl.
CPC .. *B60P 3/20* (2013.01); *B60P 3/00* (2013.01)

(58) Field of Classification Search
USPC ........................................................ 414/398
See application file for complete search history.

(56) References Cited

U.S. PATENT DOCUMENTS

| 5,490,755 A * | 2/1996 | Billotte ................... 414/550 |
| 5,526,583 A * | 6/1996 | Hull et al. .................. 34/491 |
| 6,106,209 A * | 8/2000 | Krenek ................... 414/24.5 |
| 2009/0194000 A1 * | 8/2009 | Jacob .................. B60F 1/005 105/72.2 |
| 2010/0052279 A1 * | 3/2010 | Walters, Jr. ................. 280/86.5 |

FOREIGN PATENT DOCUMENTS

| DE | 752816 | * | 7/1956 |
| WO | WO 96/37425 | * | 11/1996 |

* cited by examiner

*Primary Examiner* — Saul Rodriguez
*Assistant Examiner* — Willie Berry, Jr.
(74) *Attorney, Agent, or Firm* — Vierra Magen Marcus LLP

(57) ABSTRACT

A transition dock is disclosed allowing palletized product to be loaded into transport conveyors at a worksite. The product may be produce and the worksite may be a field where the produce is harvested. Where operating at a field where produce is harvested, the loading dock facilitates loading of the produce into a reefer to begin the cold chain at the field.

17 Claims, 16 Drawing Sheets

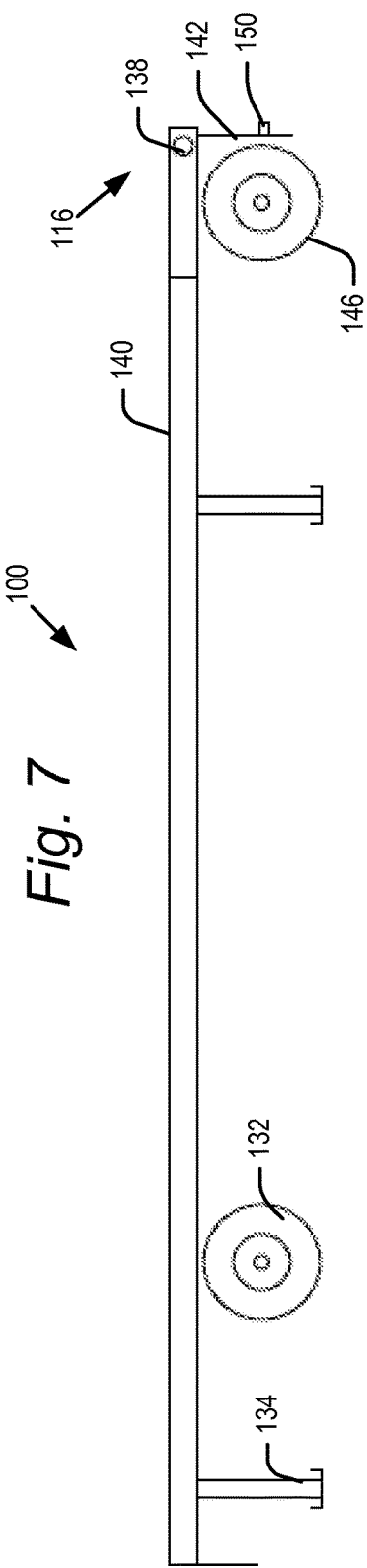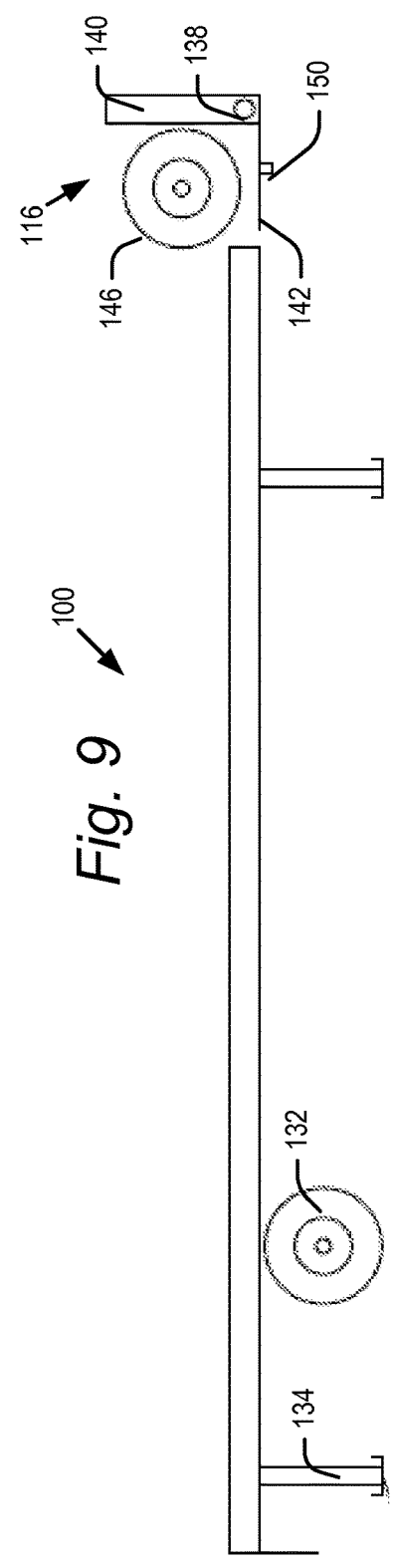

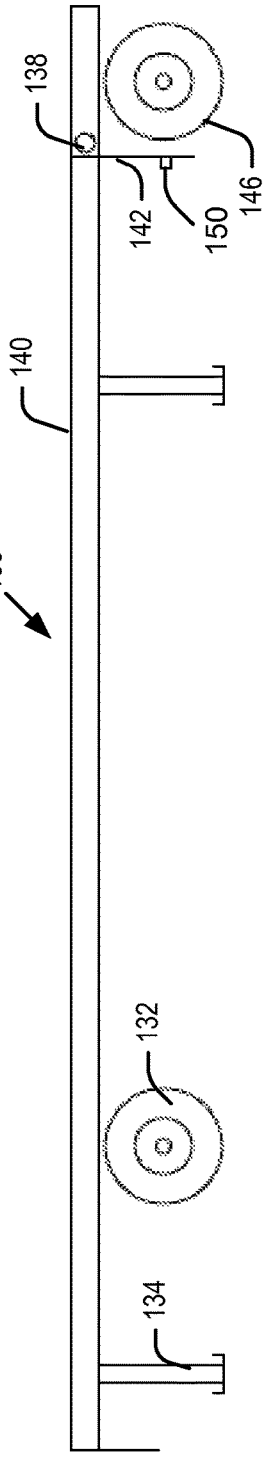
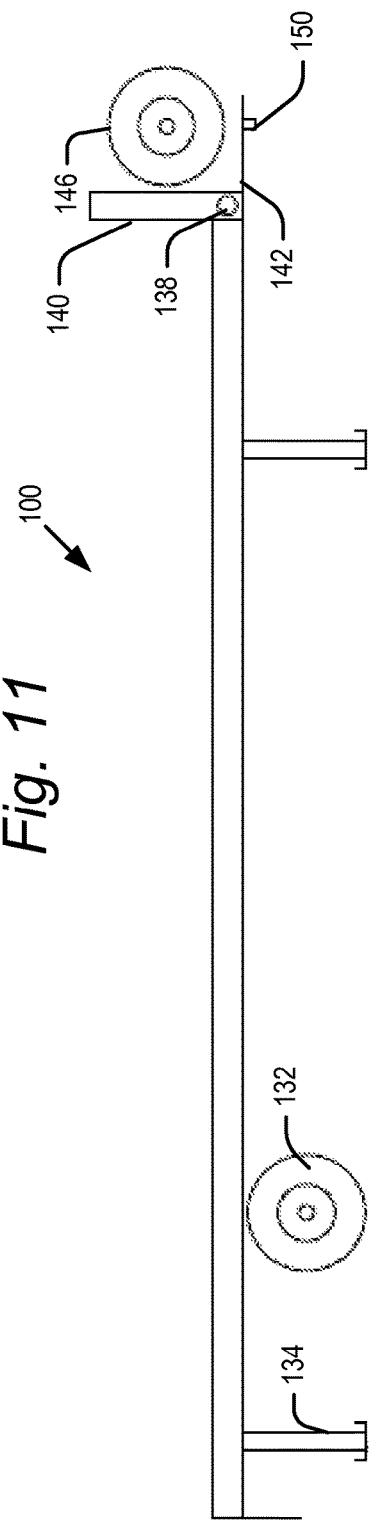

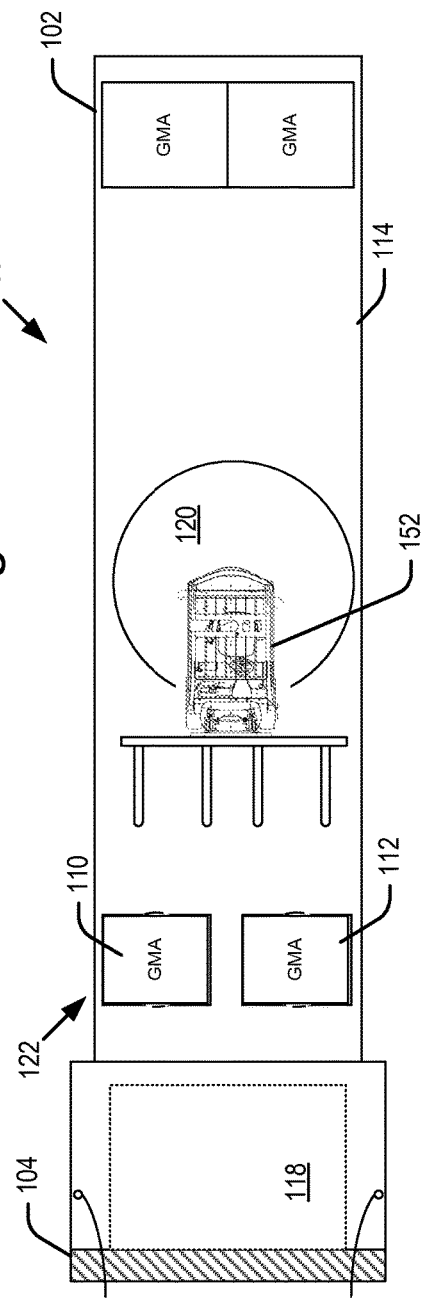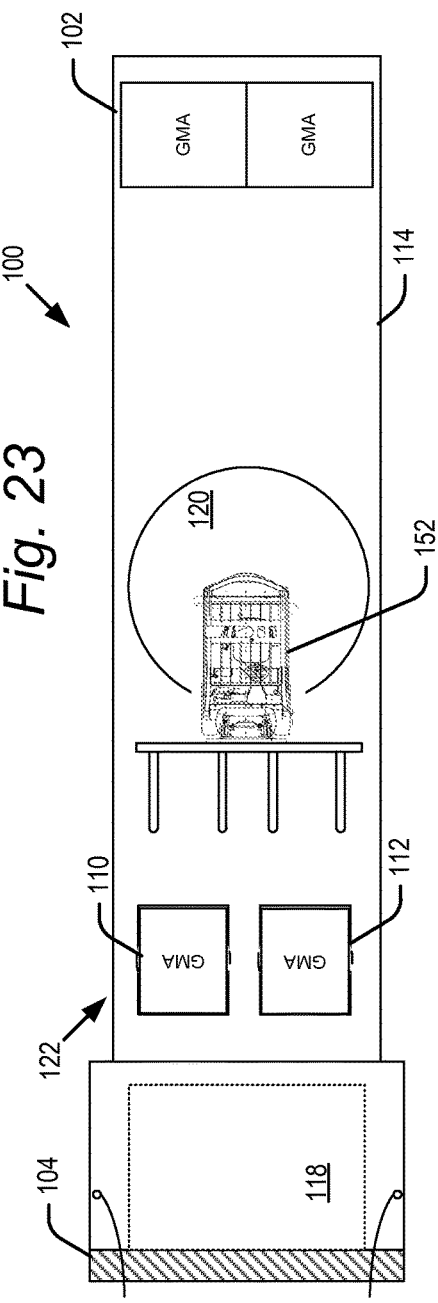

PORTABLE TRANSITION DOCK FOR PALLETIZED PRODUCT

BACKGROUND OF THE INVENTION

Field

The present technology relates to systems and methods for transporting palletized product.

Description of Related Art

Fruits and vegetables are living organisms that continue essential chemical and physiological activities after harvest. These activities can include physiological breakdown, physical injury to tissue, invasion by microorganisms, and moisture loss. Additionally, some fruits and vegetables can suffer damage while being transported hot from the field. Thus, the time between harvest and cooling to remove field heat and slow plant respiration, otherwise known as the "cut-to-cool" interval, is critical for ensuring the quality and safety of the product.

The term "cold chain" refers to the uninterrupted temperature management of perishable product in order to maintain quality and safety from the point of post-harvest cooling through the distribution chain to the final consumer. The cold chain ensures that perishable product are safe and of high quality at the point of consumption. Failing to keep product at the correct temperatures can result in a variety of negative attributes including, among others, textural degradation, discoloring, bruising, and microbial growth.

Typically, fruits and vegetables may be harvested into trucks which carry the produce to fixed-base cooling facilities, where the produce is cooled and the cold chain begins. The produce is then transported from the cooling facilities to their final destination, often in refrigerated semi-trailers called reefers. Transporting produce to and from a cooling facility has several drawbacks. First, during transport from the field to the cooling facility in open vehicles, the produce is generally exposed to wind, sun and heat, which can result in moisture loss, physiological breakdown and textural degradation.

A further drawback is the need to have produce grown proximately to cooling facilities to minimize the time between harvest and cooling. This has the effect of limiting the uses of fertile areas to only certain durable crops if they are too far from a cooling facility. This has the further effect of artificially driving up the cost of fertile areas near a cooling facility.

DESCRIPTION OF THE DRAWINGS

FIG. 7 is a side view of a flip axle assembly of the portable transition dock in the deployed position according to embodiments of the present disclosure.

FIG. 9 is a side view of a flip axle assembly of the portable transition dock in the transport position according to embodiments of the present disclosure.

FIG. 10 is a side view of a flip axle assembly of the portable transition dock in the deployed position according to an alternative embodiment of the present disclosure.

FIG. 11 is a side view of a flip axle assembly of the portable transition dock in the transport position according to an alternative embodiment of the present disclosure.

FIG. 22 is a top view of pallets shifted apart on pallet turntables of a pallet shift and rotate assembly.

FIG. 23 is a top view of pallets shifted apart and rotated on pallet turntables of a pallet shift and rotate assembly.

DETAILED DESCRIPTION

Figure 1:
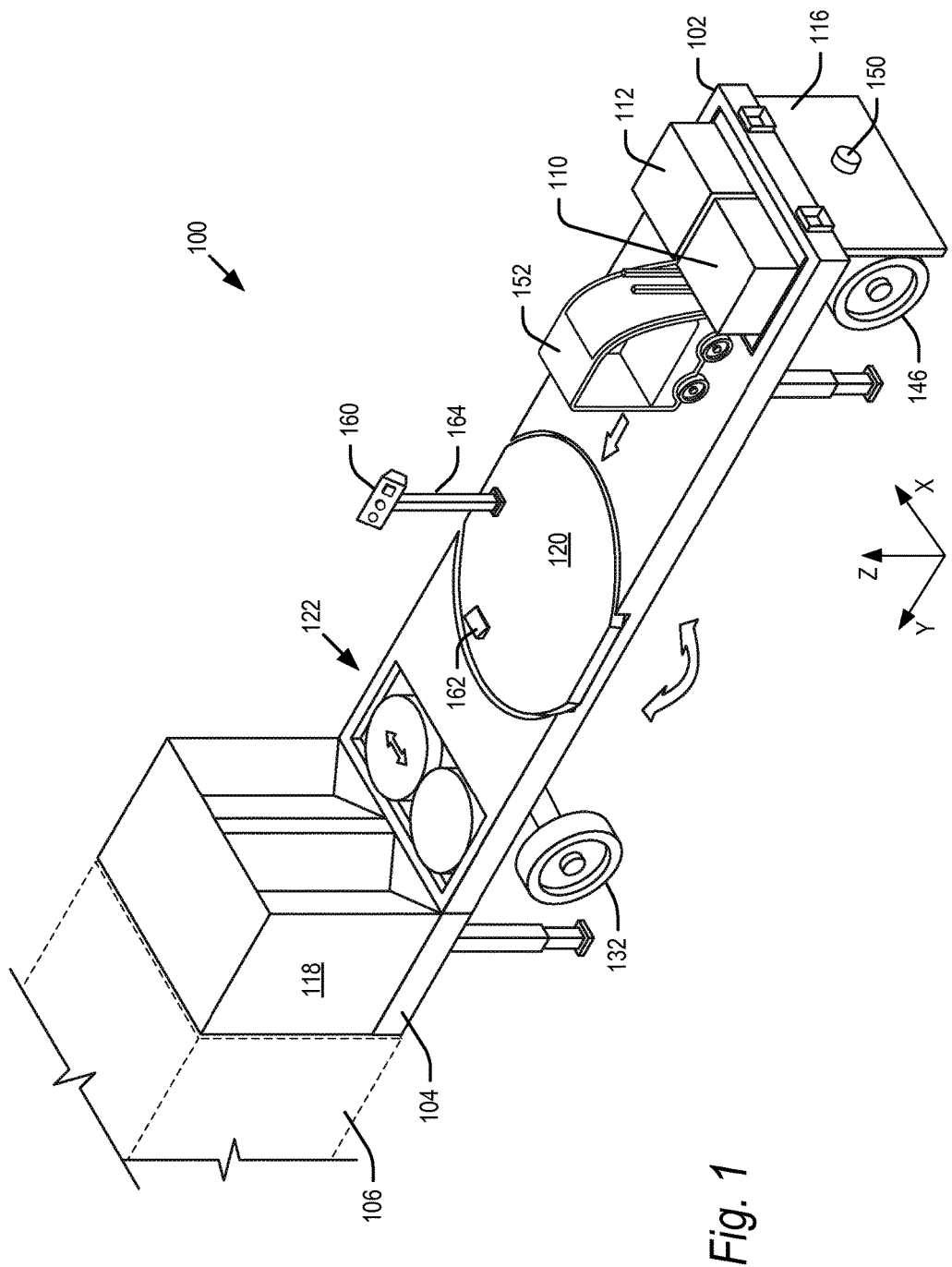
FIG. 1 is a perspective view of a portable transition dock according to embodiments of the present disclosure.
Figure 2:
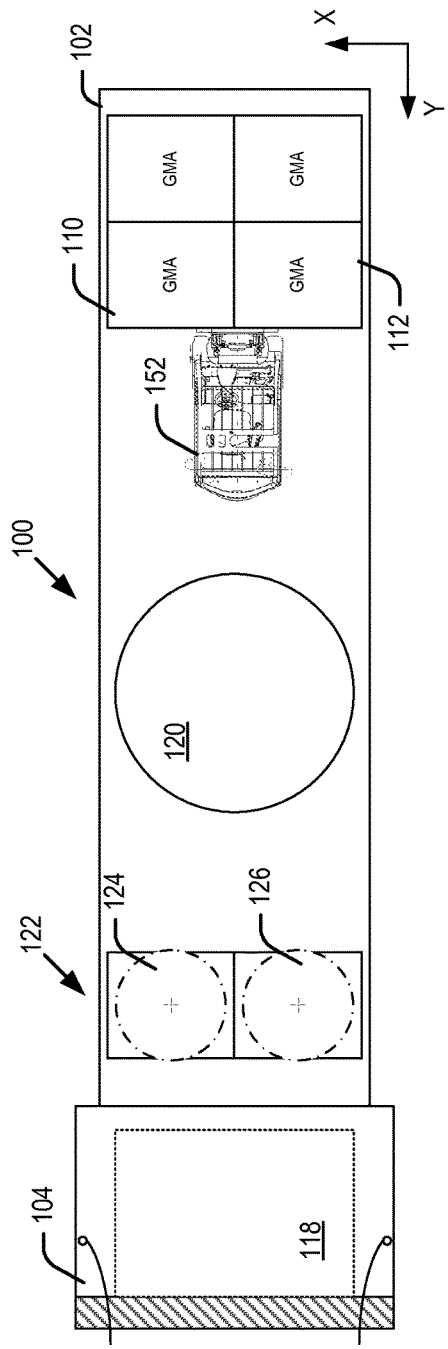
FIG. 2 is a top view of a portable transition dock according to embodiments of the present disclosure.

Embodiments of the present disclosure will now be described with reference to FIGS. 1-24 which in general relate to a portable transition dock allowing palletized product to be loaded into transport conveyors at a worksite such as the field where the product is harvested. It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Referring initially to FIGS. 1-4, there is shown a portable transition dock 100. Embodiments of the portable transition dock 100 described below may be used to load perishable product such as certain fruits and vegetables into a reefer to begin the cold chain at the field where the product is harvested. This is in contrast to conventional systems where the cold chain does not start until the product is transported from the field to a distribution center where it is then processed. In embodiments, the portable transition dock 100 may work in conjunction with a field cooling unit, embodiments of which are described in co-pending patent application Ser. No. 13/282,250, entitled, "Portable Field Vacuum Cooling System and Method," Oct. 26, 2011 which application is incorporated herein by reference in its entirety.

While advantageously employed to cool produce at the harvest site, it is understood that the present technology may be used to load any palletized product, perishable or otherwise, from a loading conveyor to a transport conveyor. Moreover, the present technology need not operate only at a field where produce is harvested. It may be employed at any worksite where palletized product is transferred from a loading conveyor to a transport conveyor.

As used herein, a "loading conveyor" is a conveyor used to transport product short distances. Examples include forklifts for transferring palletized product and field harvesting trucks, such as for example a Fabco® field harvesting truck manufactured by Fabco Equipment, Inc. having headquarters in Milwaukee, Wis. A "transport conveyor" as used herein is any conveyor that may be used to transport palletized product long distances, such as for example trucks, trailers, reefers and rail cars. As seen in the figures, a loading conveyor 108 is used to load palletized product onto a loading end 102 of transition dock 100, and a transport conveyor 106 receives palletized product from a transport end 104 of the transition dock 100.

FIGS. 1-4 include reference axes X, Y and Z defined with respect to the portable transition dock 100, with the X axis oriented across the width of the transition dock, the Y axis oriented along the length of the transition dock, and the Z axis located perpendicularly with respect to the X-Y plane. It is understood that these reference axes are used for ease of description only, and should not be considered as limiting on the present disclosure.

In general, a loading conveyor 108 loads palletized product onto the portable transition dock whereupon the pallets are transferred into a transport conveyor 106. One example of a pallet which may be used with the present technology is a Grocery Manufacturer's Association (GMA) pallet having a width of 48 inches, a depth of 40 inches, and a height of approximately 5 inches. It is understood that the present technology may be used to transfer product on a wide variety of other pallets in further embodiments.

Figure 4:
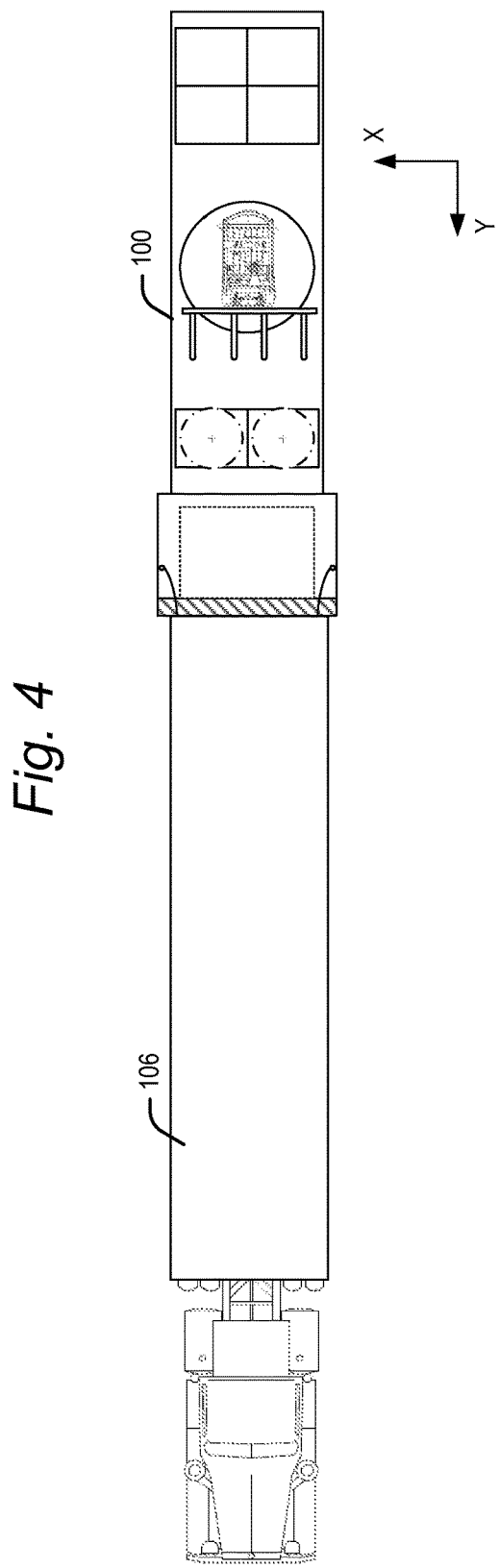
FIG. 4 is a top view of a portable transition dock according to embodiments of the present disclosure transferring palletized product to a transport conveyor, such as for example a reefer.

A loading conveyor 108 may load a pair of pallets together onto portable transition dock 100 side-by-side with the width dimension of both pallets oriented across the width of the portable transition dock 100. Thus, where GMA pallets are used, the pallets together take up 8 feet across the width of the dock 100. In embodiments, a loading conveyor 108 may have a width along the X axis of 8 feet, 6 inches. This corresponds generally to the width of a typical transport conveyor 106, such as for example a reefer as shown in FIG. 4. However, it is understood that a portable transition dock 100 may have a larger or smaller width in further embodiments. Where the width is larger, more than two pallets may be loaded simultaneously side by side onto a portable transition dock across a width of the dock. Moreover, it is contemplated that a single pallet may be loaded onto a portable transition dock 100 from a loading conveyor 108 in further embodiments and transferred on the dock instead of a pair of side-by-side pallets.

Product may for example be stacked on the pallets within cartons. Each pallet may for example hold a pair of vertically stacked cartons. Thus, in one embodiment, four cartons of product may be stacked on two side-by-side pallets onto a portable transition dock 100 by a loading conveyor 108. A single product carton or more than three product cartons may be stacked on a pallet in further embodiments.

It is a feature of the portable transition dock 100 that it includes a locomotion system so that it may be portable, both at a field where product is harvested, and over roads and highways. As explained below, the portable transition dock may include motors and drive mechanisms so that it may be self-propelled short distances, for example to position or reposition the portable transition dock 100 at a field where product is harvested. As is further explained below, the portable transition dock may be coupled to a road tractor for transport over roads and highways. In embodiments, when connected to a road tractor, the road tractor and portable transition dock may be over-the-road legal under the Department of Transportation (DOT) and Federal Motor Vehicle Safety Standards (FMVSS), for example requiring only an oversized permit.

In embodiments, the portable transition dock 100 may include a platform 114 having a flip axle assembly 116 at loading end 102, and a vestibule 118 at the transport end 104. The platform 114 may further include a forklift turntable 120, and a pallet shift and rotate assembly 122 including a pair of pallet turntables 124 and 126. Each of these components is explained in greater detail below.

Figure 3:
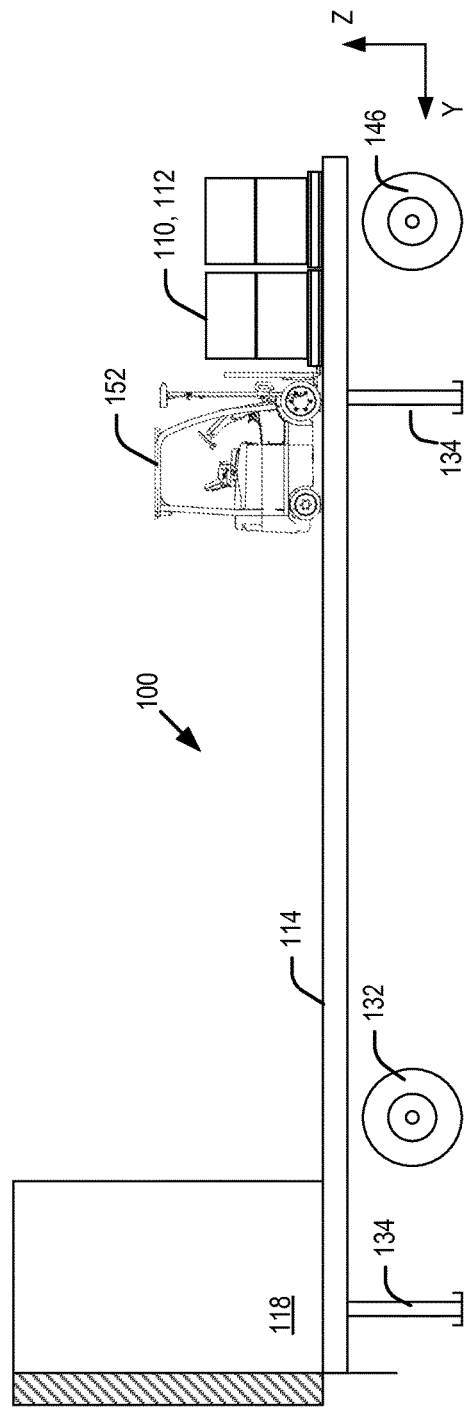
FIG. 3 is a side view of a portable transition dock according to embodiments of the present disclosure.
Figure 5:
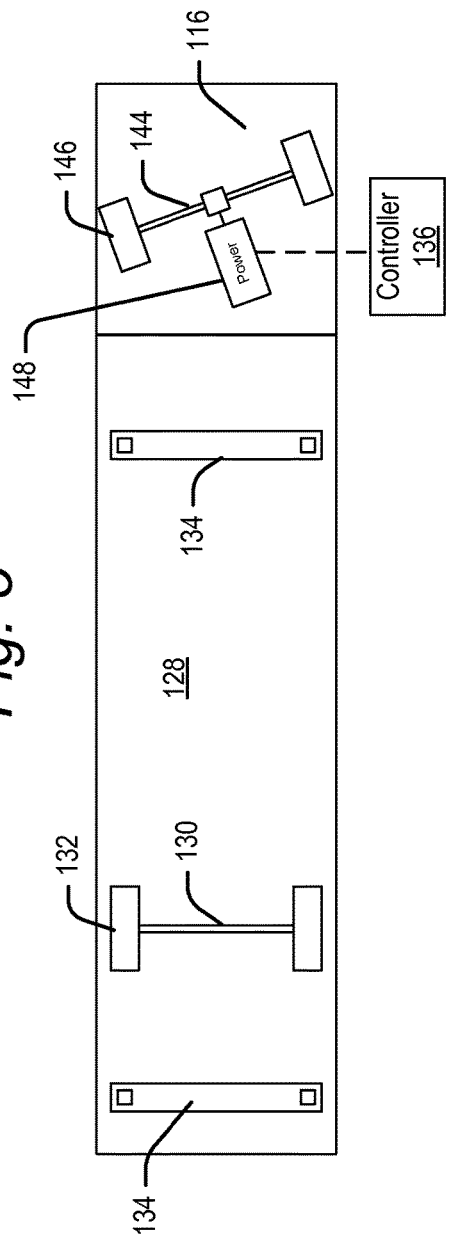
FIG. 5 is a bottom view showing the undercarriage of the portable transition dock according to an embodiment of the present disclosure.

Platform 114 may be formed of a steel plate supported on a steel chassis. In one example, platform 114 may have a width of 8 feet, 6 inches and a length of 38 to 48 feet. It is understood that the platform 114 may have a width and length which are greater or smaller than these dimensions in further embodiments. The platform 114 may be mounted on an undercarriage 128 having a structure and components similar to that of a known semi-trailer. FIGS. 3 and 5 illustrate features of undercarriage 128. In one example, undercarriage 128 may include a rear axle 130 as part of the locomotion system including wheels 132 allowing transport of portable transition dock 100. As is known, rear axle 130 may be a typical fixed trailer axle including for example spring suspension, hydraulic height control and air brakes. The hydraulic height control may include a hydraulic swing arm (not shown) allowing the platform 114 to raise or lower to match the height of the transport conveyor 106. Another feature of the hydraulically mounted axle is the ability to lower the platform while being transported over the highway, lowering the vestibule to clear bridges and over passes. Rear axle 130 may have a length so as to position the wheels 132 at the edges of platform 114.

Undercarriage 128 may further include stabilizers 134 for stabilizing the portable transition dock 100 at a desired height when in use to transfer palletized loads. Each stabilizer 134 may include a hydraulic lift for adjusting its height and a height of the platform 114. The stabilizers may be controlled by a controller 136, shown schematically in FIG. 5 and explained in greater detail below.

Figure 8:
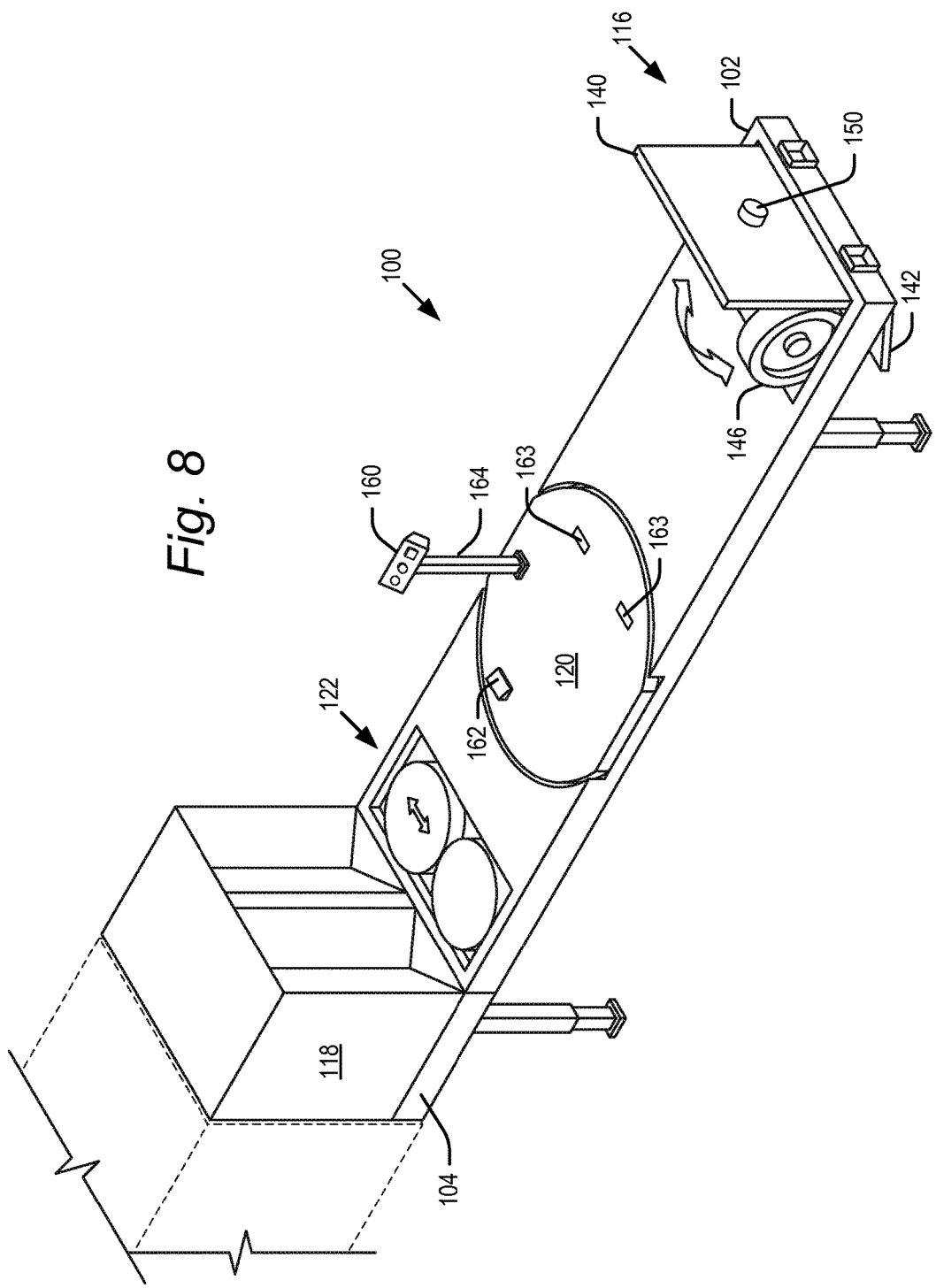
FIG. 8 is a perspective view of a flip axle assembly of the portable transition dock moving between deployed and transport positions.

As seen in FIGS. 5-9, the loading end 102 of portable transition dock 100 includes a flip axle assembly 116. The flip axle assembly 116 includes a pivot coupling 138 allowing the flip axle assembly 116 to pivot between first and second positions about a fixed point in loading end 102. As seen in FIGS. 7-9, flip axle assembly 116 includes a deployment leg 140 and a transport leg 142 coupled to each other at a generally right angle. FIGS. 1-7 show the flip axle assembly 116 in the deployed position. In this position, a top surface of deployment leg 140 is coplanar with the remainder of platform 114 and may have the same width as the platform 114 to allow palletized product to be deployed onto the platform 114 over deployment leg 140.

The deployment leg further includes an undercarriage including a front axle 144 (FIG. 5) as part of the locomotion system. Front axle 144 may be a typical drive axle assembly similar to that of a known semi-trailer, including for example wheels 146 and a drive train 148 for pivoting axle 144 and rotating wheels 146. The front axle 144 may further include spring suspension, hydraulic height control and air brakes. The drive train 148 may be controlled by controller 136. Controller 136 may be wirelessly or hard-wired to drive train 148, axles 130, 144 and the stabilizers 134. An operator on or near the portable transition dock 100 may use controller 136 to move the transition dock around a field or worksite under its own power. Once positioned, the operator may adjust the upper surface of portable transition dock 100 via the controller 136 to the right height for the loading conveyor 108 and the transport conveyor 106.

Figure 6:
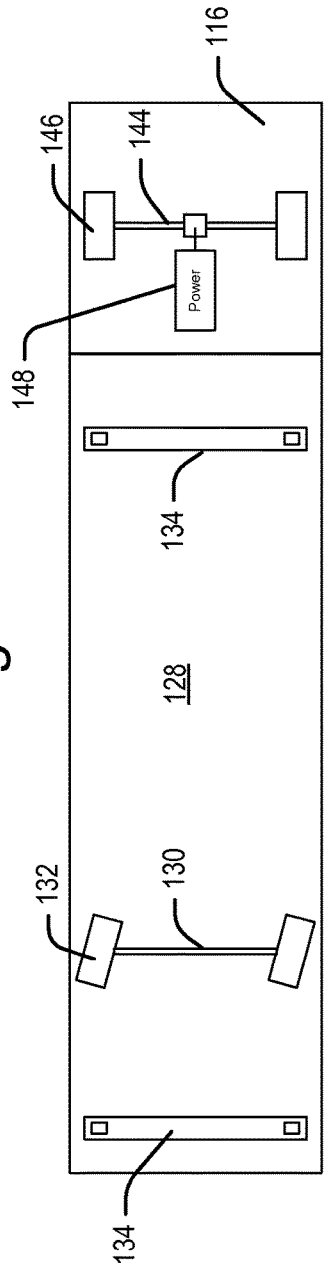
FIG. 6 is a bottom view showing the undercarriage of the portable transition dock according to an alternative embodiment of the present disclosure.

FIG. 6 shows an alternative embodiment of the portable transition dock 100 where rear axle 130 is pivotally mounted and front axle 144 is stationarily mounted to enable steering of the portable transition dock 100 via rear axle 130.

FIG. 8 is a perspective view showing the flip axle assembly 116 moving between the deployed and transport positions about pivot coupling 138. FIG. 9 is a side view of the flip axle assembly in the transport position. In the transport position, the front axle 144 and wheels 146 have rotated 90° upward away from the ground, and the transport leg 142 is positioned generally parallel to platform 114. An underside of transport leg 142 includes a kingpin 150 for mounting to a fifth wheel (not shown) of a road tractor as is known in the art. In this position, the portable transition dock 100 is configured for over-the-road transport, and may for example be transported to another field or worksite.

In the above-described embodiment of flip axle assembly 116, the pivot coupling 138 is positioned at the front edge of loading end 102. In an alternative embodiment shown in FIGS. 10 and 11, the pivot coupling 138 may be moved distally from the front edge of loading end 102. In this embodiment, the flip axle assembly 116 works as described above to pivot between a deployed and transport position, but in this embodiment, the flip axle assembly 116 pivots counter-clockwise (from the perspective of FIGS. 10 and 11) when moving from the deployed to transport positions.

Figure 12:
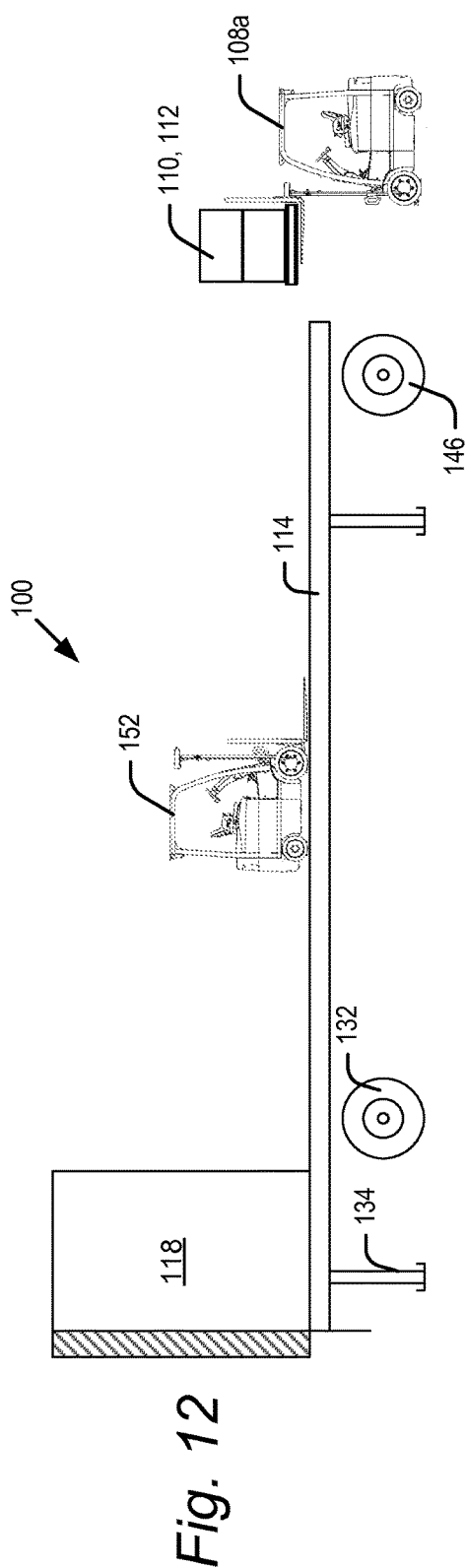
FIG. 12 illustrates palletized product being loaded on the loading end of a portable transition dock by a forklift.

FIG. 12 illustrates an embodiment where a palletized product is loaded onto a rear of loading end 102 by a loading conveyor 108, which in this embodiment is a field forklift 108a. FIG. 12 shows field forklift 108a loading a single pair of side-by-side pallets 110, 112 onto loading end 102 of portable transition dock 100. It is understood that more than one pair of side-by-side pallets may be positioned on the loading end 102 by field forklift 108a. Thereafter, the pallets 110, 112 may be acquired by dock forklift 152 as described hereinafter.

Figure 13:
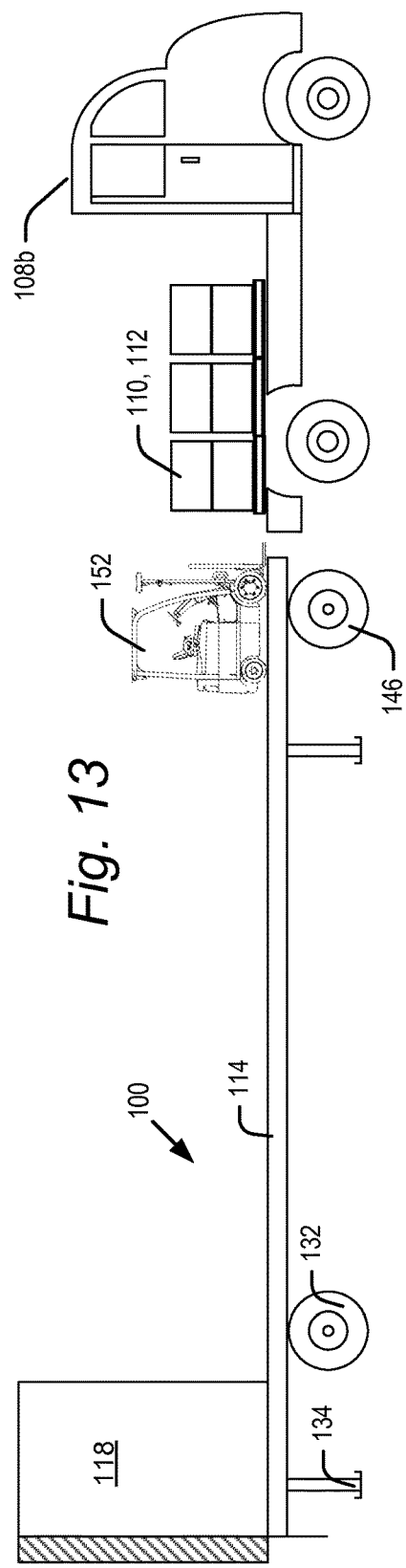
FIG. 13 illustrates palletized product being loaded on the loading end of a portable transition dock by a field harvesting truck.
Figure 14:
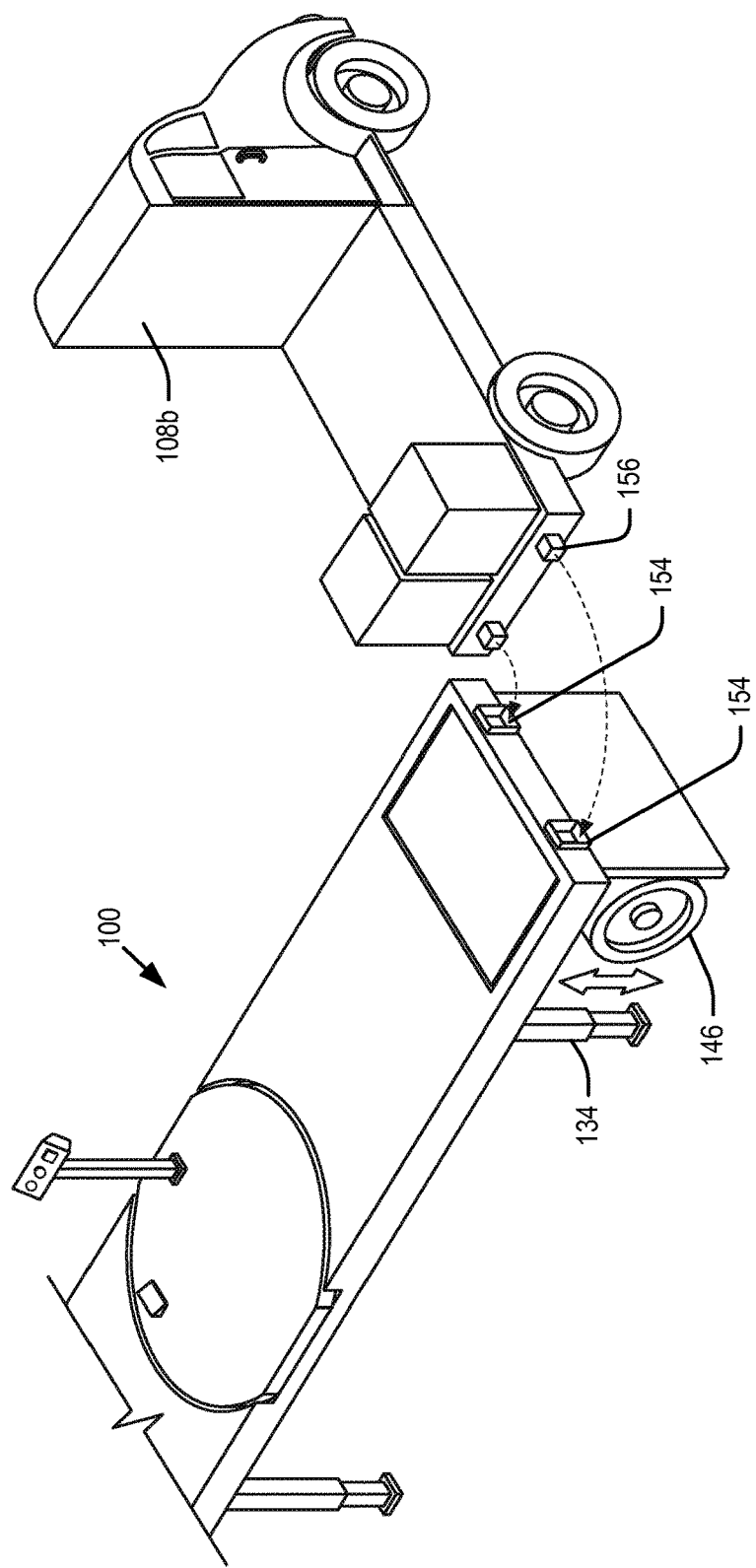
FIG. 14 is a perspective view of receptacles on the portable transition dock for receiving tines of the field harvesting truck to align the truck to the portable transition dock.

FIG. 13 illustrates a further embodiment where palletized product may be loaded onto loading end 102 of dock 100 from a loading conveyor 108 in the form of a field harvesting truck 108b. In this embodiment, the truck 108b may back up to the loading end 102 of dock 100, and thereafter the dock forklift 152 loads the rear-most pallet off of the field harvesting truck 108b. The field harvesting truck may include chains or a belt in the bed of the truck to move pallets rearward as pallets are unloaded from the truck. In this way, a pair of pallets will always be available at the rear of the harvesting truck 108b for access by the dock forklift 152 until all pallets have been offloaded from the harvesting truck 108b. As shown in FIG. 14, a rear edge of loading end 102 may include a pair of vertically oriented female receptacles 154 for receiving a pair of tines 156 in the field harvesting truck 108b. The tines 156 may be longer than shown in the figure. The coupling of the tines 156 within receptacles 154 may ensure proper alignment of the field harvesting truck 108b as it backs up against the portable transition dock 100. In operation, the field harvesting truck 108b may back straight up to the end 102 of transition dock 100. The truck is shown approaching at an angle in FIG. 14 only so that the tines 156 may be shown.

Figure 15:
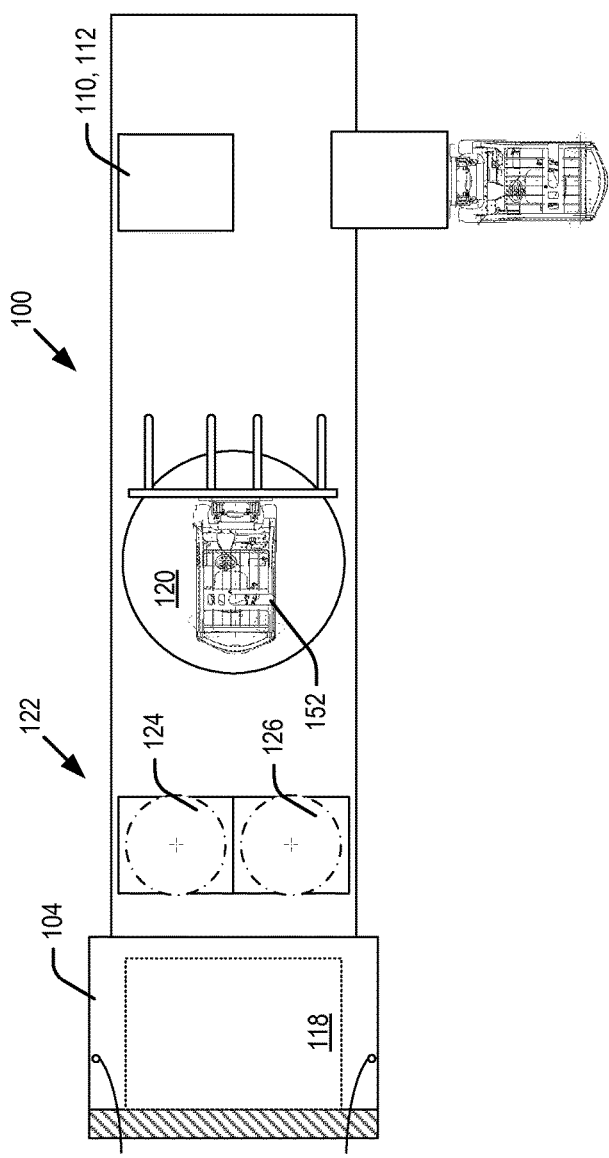
FIG. 15 is an alternative embodiment for loading a portable transition dock from a side of the dock.

In the embodiments described above, palletized product is loaded onto dock 100 from a rear of the loading end 102. FIG. 15 illustrates an alternative embodiment where palletized product is loaded onto the portable transition dock 100 from the side, for example by a field forklift 108a. In this embodiment, a pair of pallets 110, 112 may be loaded onto loading end 102 side-by-side with either a width or length of the pallets 110, 112 oriented across a width of the dock 100. In a further embodiment, pallets 110, 112 may be loaded from one or both sides of dock 100 onto pallet turntables 124, 126 of the pallet shift and rotate assembly 122. Thereafter, the pallets may be repositioned as desired as explained in greater detail below.

Dock forklift 152 is provided for transferring palletized product from the loading end 102 to the transport end 104 and into a waiting transport conveyor 106. In an embodiment of the present disclosure, it is a safety feature that dock forklift 152 moves only in a straight line along the Y-axis, back and forth along the length of portable transition dock 100. In order to allow dock forklift 152 to pick up pallets 110, 112 at the loading end 102 and drop them off at transport end 104, dock 100 includes a forklift turntable 120 for rotating the dock forklift 180°.

Figure 16:
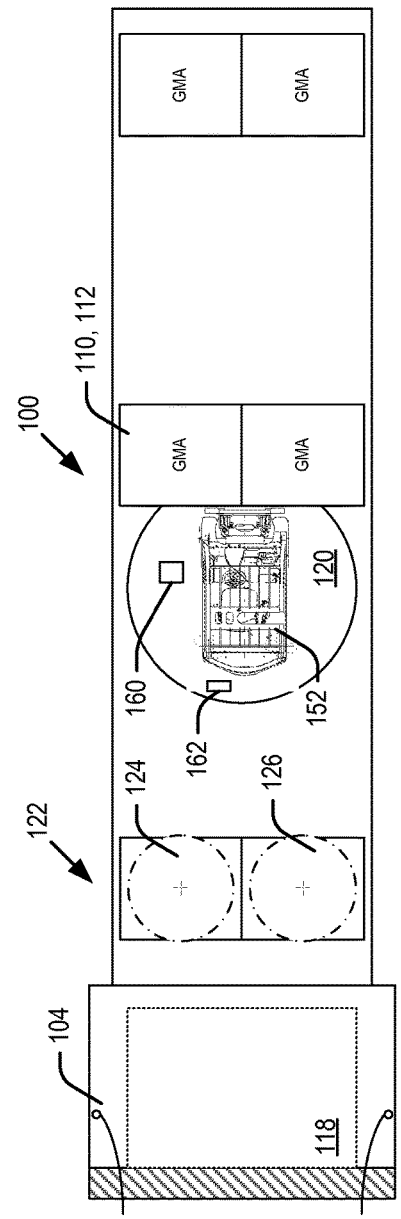
FIG. 16 is a top view of a dock forklift positioned on a turntable of a portable transition dock according to embodiments of the present disclosure.
Figure 17:
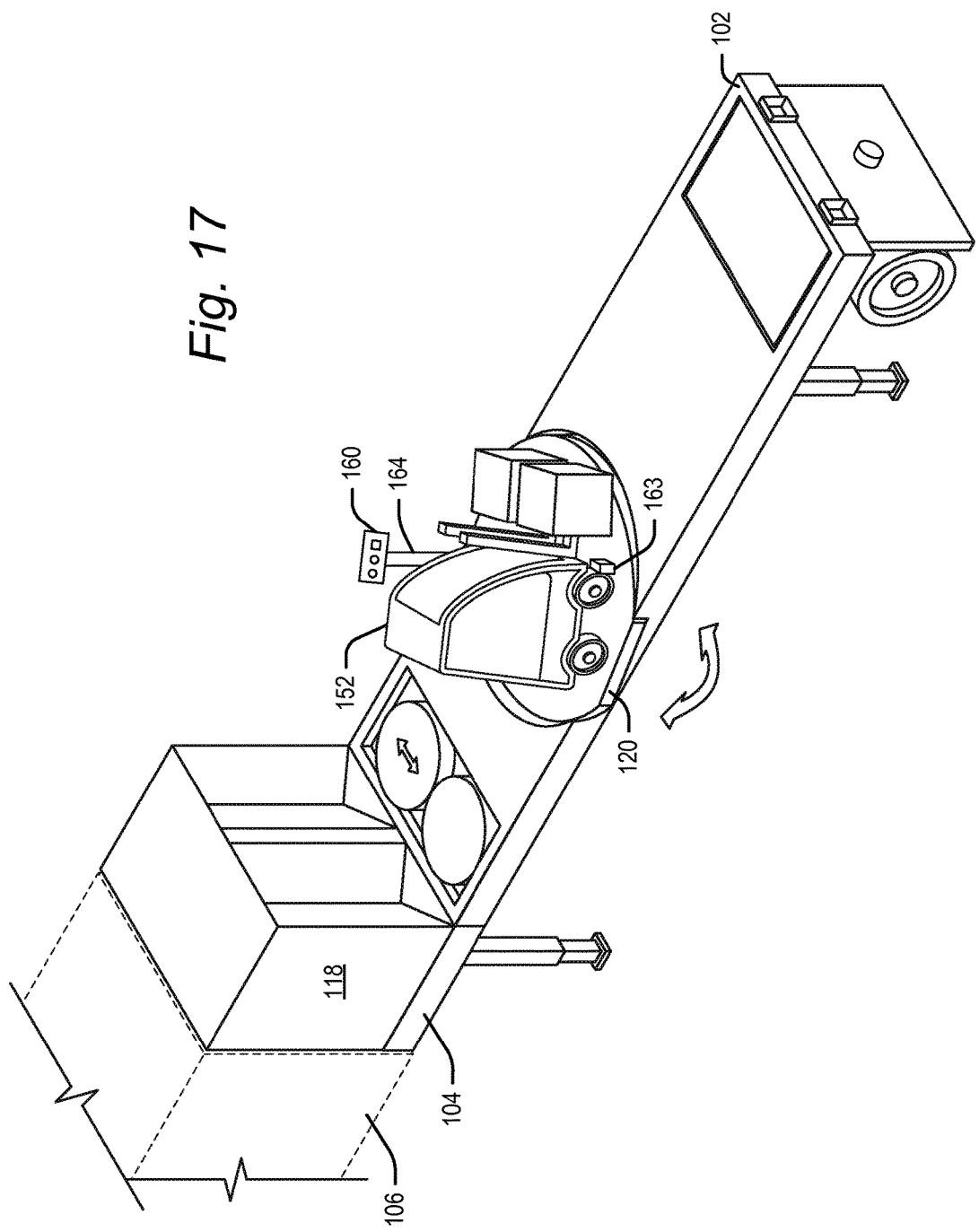
FIG. 17 is a perspective view of a dock forklift in rotation on a turntable of a portable transition dock according to embodiments of the present disclosure.
Figure 18:
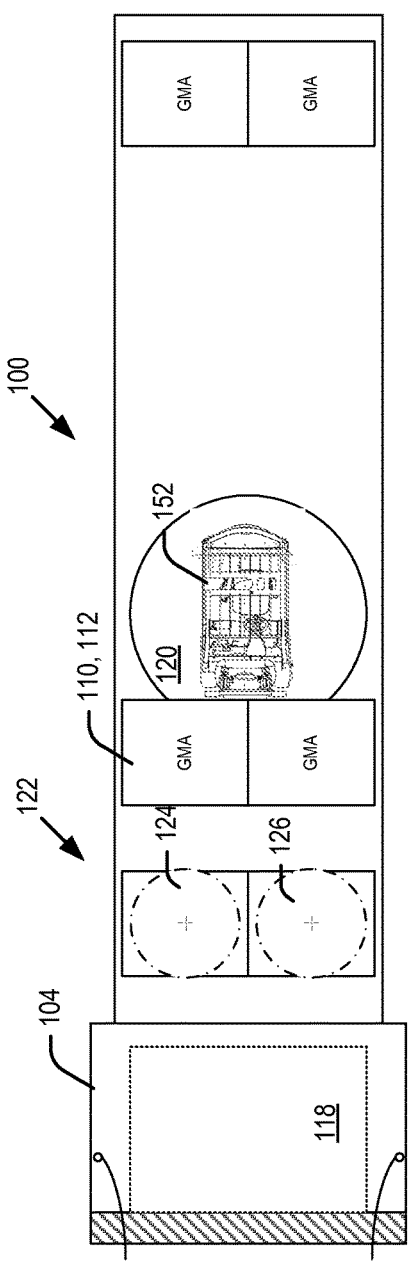
FIG. 18 is a top view of a dock forklift rotated toward the transport end of a portable transition dock according to embodiments of the present disclosure.

Once dock forklift 152 has acquired pallets 110, 112 from loading end 102, dock forklift 152 backs onto forklift turntable 120 as shown in FIG. 16. Thereafter, forklift turntable 120 rotates as seen in FIG. 17 to reposition dock forklift 152 to face transport end 104 of dock 100. Forklift turntable 120 is rotationally mounted within platform 114 and includes a drive motor (not shown) under the control of turntable controller 160.

Forklift turntable 120 may include various safety features to ensure that the turntable 120 only operates when the dock forklift 152 is properly positioned thereon. For example, forklift turntable 120 may include a trigger plate 162 which prevents rotation of the forklift turntable 120 unless the trigger plate 162 is engaged and pressed downward toward platform 114. Trigger plate 162 is biased into a locked position where it angles upward from the surface of forklift turntable 120. In operation, when an operator reverses dock forklift 152 onto turntable 120, rear wheels of the dock forklift 152 will engage and depress trigger plate 162 when the dock forklift 152 is properly positioned on the turntable. Depression of the trigger plate 162 releases the forklift turntable 120 from a locked position and allows rotation of the turntable.

Forklift turntable 120 further includes a turntable controller 160, which in embodiments is mounted on a post 164 (FIG. 17) extending upward from forklift turntable 120. When manually activated by an operator of dock forklift 152, the turntable controller 160 rotates the forklift turntable 180°. The turntable controller 160 is provided at a position such that an operator sitting in dock forklift 152 would be able to access turntable controller 160 only when dock forklift 152 is properly positioned on forklift turntable 120. In embodiments, the turntable controller 160 may be manually activated using a single hand, or in further embodiments, may require two-handed activation as a further safety precaution.

As a further safety feature, the turntable 120 may further include a pair of wheel stops 163 that raise up in front of the turntable forklift tires to keep the forklift driver from driving off the edge of the dock while the turntable is rotating. The wheel stops raise from a retracted position (FIG. 8) to an extended position (FIG. 17) automatically as the turntable 120 rotates.

In embodiments, once activated, turntable 120 continues rotating through a full 180°. In this embodiment, no partial rotation of the turntable is possible to reduce the likelihood that the forklift operator would drive the dock forklift 152 off the side of dock 100.

It is understood that one or more of the above-described safety precautions may be omitted in further embodiments. Trigger plate 162 may be omitted and, instead of being mounted on post 164, controller 160 may be a portable, handheld controller (possibly integrated with controller 136 described above). Moreover, the angle of rotation of forklift turntable 120 can be user controlled to be less than or greater than 180°.

In further embodiments, an operator of dock forklift 152 may reverse the direction of forklift 152 by methods other than forklift turntable 120. For example, in one alternative embodiment shown in FIG. 19A, a U-turn wing 166 may be provided on portable transition dock 100 allowing an operator to acquire palletized product from loading end 102, make a U-turn using wing 166 and then deliver the palletized product to transport end 104.

Figure 19A:
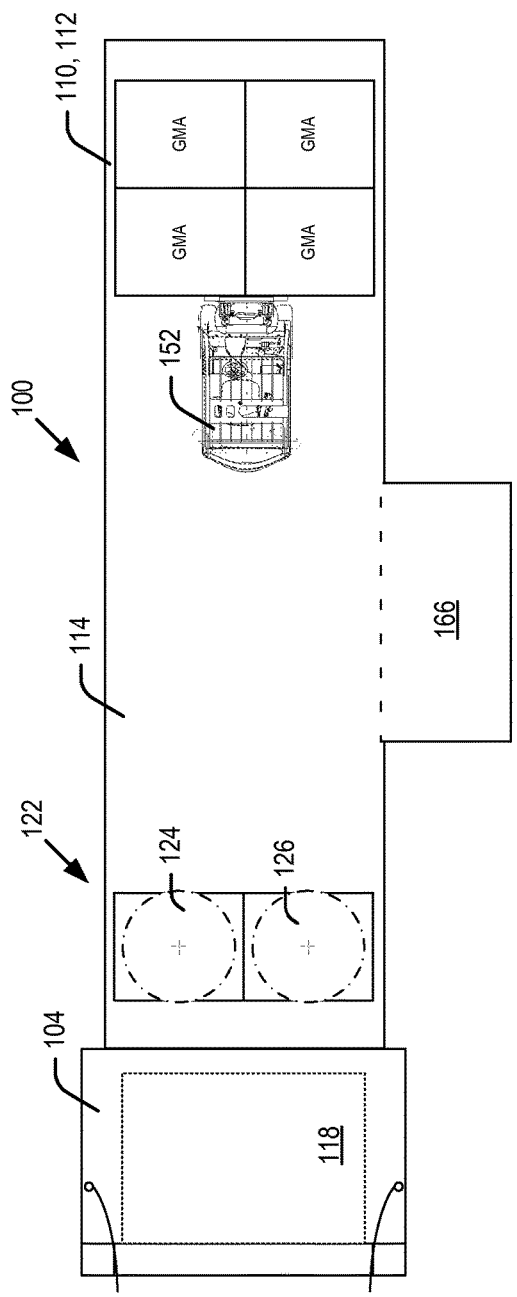
FIGS. 19A and 19B are two top views of the portable transition dock according to two alternative embodiments of the present disclosure.
Figure 19B:
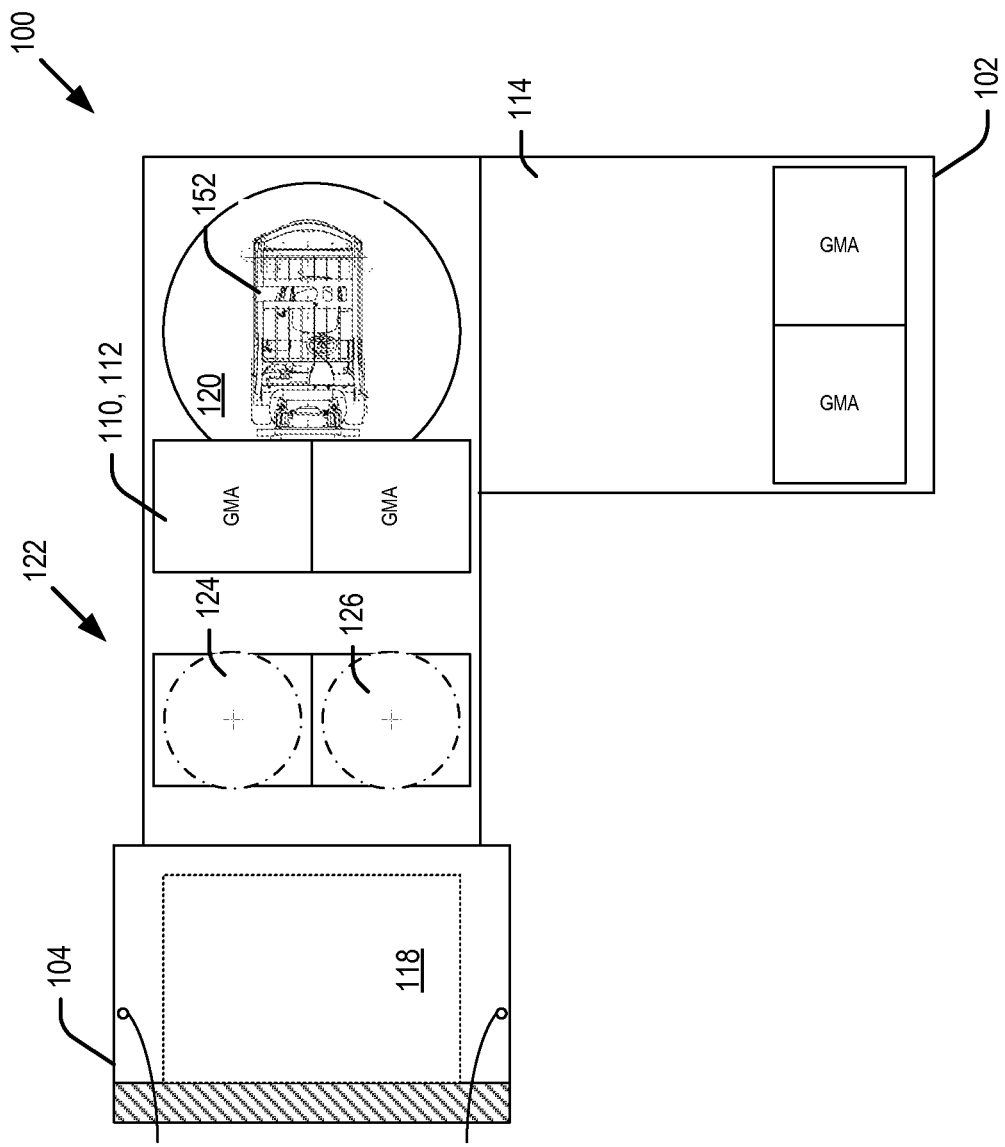

In the embodiments described above, the portable transition dock 100 is straight and the turntable 120 is set to rotate 180° so that the dock forklift 152 may travel along a straight line. However, it is contemplated that the portable transition dock 100 need not be straight in alternative embodiments. As shown in FIG. 19B, the loading end 102 may be angled with respect to the transport end 104, for example at 90°. In this embodiment, the turntable 120 may be set to rotate only 90°. This ensures that the operator need still only drive straight onto and off the turntable 120 when transferring pallets between ends 102 and 104. In this embodiment, the portable transition dock 100 may have two straight sections that couple together when in use, but decouple from each other for transport.

Figure 20:
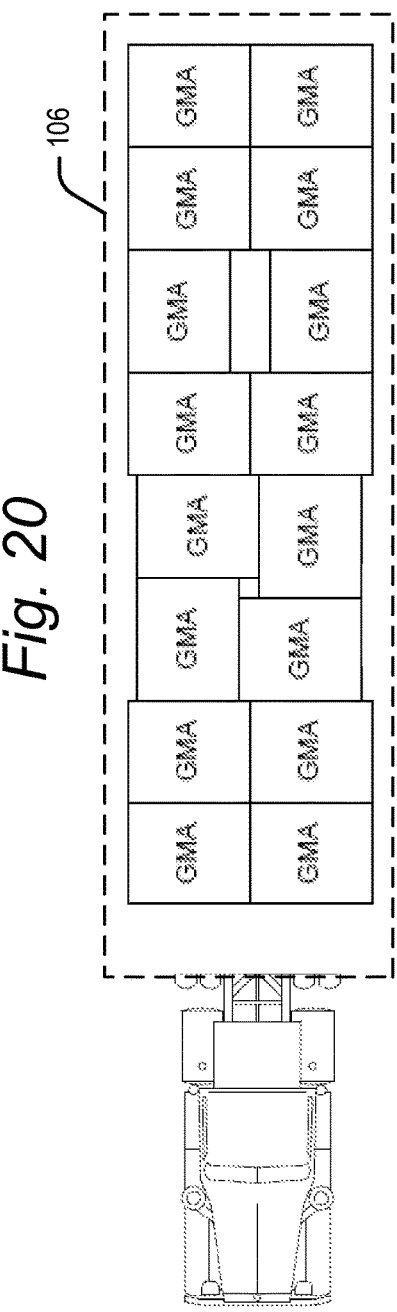
FIG. 20 is a top view of a possible layout of palletized product within a transport conveyor.
Figure 21:
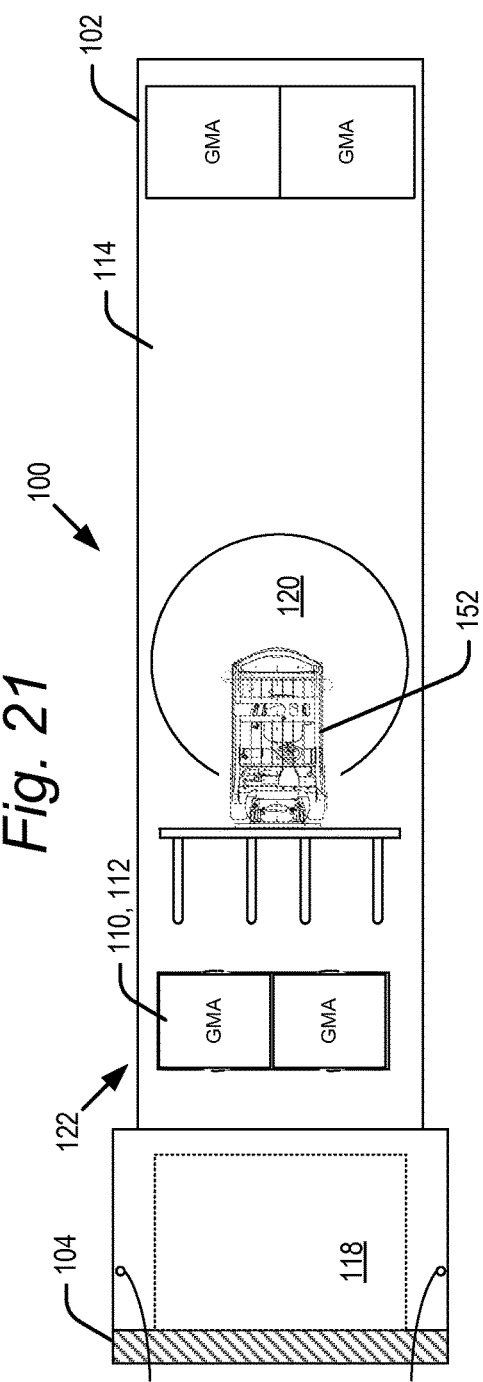
FIG. 21 is a top view of pallets positioned on pallet turntables of a pallet shift and rotate assembly.

When acquired from loading end 102 and transported on dock forklift 152, pallets 110, 112 are positioned adjacent to each other side-by-side along their respective width dimensions. However, depending on the load bearing capabilities and desired weight distribution properties of the transport conveyor 106, it may not be optimal to load all pallets adjacent to each other side-by-side into transport conveyor 106. For example, FIG. 20 illustrates a transport conveyor packed with pallets from transition dock 100 where one or both pallets in a pair of pallets are rotated and some pallets are rotated and spaced from each other.

In order to accomplish this, embodiments of the transition dock 100 further include pallet shift and rotate assembly 122 having a pair of pallet turntables 124, 126. Once the dock forklift 152 exits the forklift turntable 120, it advances toward transport end 104 and lowers the pallets onto the pallet shift and rotate assembly 122, with one pallet on turntable 124 and the other on turntable 126. Turntables 124 and 126 are mounted to both rotate at least 90°. At least one of the turntables 124, 126 is also mounted to translate in the X-direction across the width of the dock 100. Each turntable may be driven by a rotational motor, and at least one is mounted on a translating drive. The motor/drive may be controlled by a controller, such as for example controller 136 or a separate controller.

The turntables 124, 126 are first shifted along the X-axis away from each other. Thereafter, one or both turntables 124, 126 can rotate. When rotating, the turntables 124, 126 may raise upward to lift the pallets off of the platform 114. The rotated pallet or pallets may then be lowered back to the platform height and thereafter reacquired, or first shifted back together and then reacquired.

As an example, where pallets have dimensions of 48 inches by 40 inches, two pallets paired along their respective widths may have a combined width of 8 feet along the X-axis. Where both pallets are rotated on pallet shift and rotate assembly 122, they may then have a combined length of 6 feet, 8 inches. This frees up an additional 16 inches along the X-axis. The two pallets may be separated by this distance, or the pallets may be brought closer together. Alternatively, one of the pallets may be rotated and the other not. In this example the combined width may be 7 feet, 4 inches, leaving 8 inches of potential space between the pallets.

Once positioned as desired by pallet shift and rotate assembly 122, the dock forklift 152 may reacquire the pallets and load them into a transport conveyor 106. It is also understood that positioning of pallets by the pallet shift and rotate assembly 122 may be skipped where there is no need to separate or rotate a pallet pair.

In embodiments, conveyor 106 may be a reefer or other refrigerated transport. Currently, when reefers are loaded away from a loading dock, the doors of the reefer must be closed to keep in the cold. In order to maintain the controlled environment within the conveyor 106 while its doors are open for loading, dock 100 further includes an enclosed vestibule 118 through which the dock forklift 152 passes into the conveyor 106.

Figure 24:
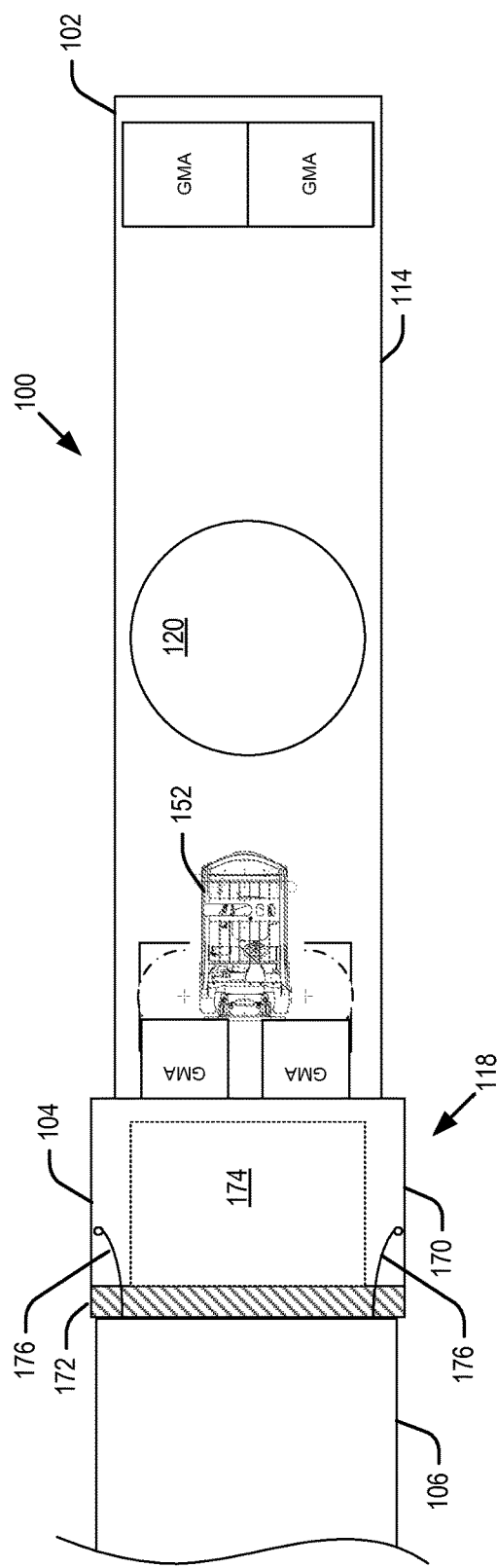
FIG. 24 is a top view of pallets being carried into a transport conveyor through a vestibule of the portable transition dock according to embodiments of the present disclosure.

As seen in FIGS. 1 and 24, the vestibule 118 may include three, thermally insulating walls 170: two horizontal and one vertical extending between and connecting to top edges of the horizontal walls. The vestibule walls may extend from the edge of the loading end 104 along the Y-direction approximately 6 feet, though the vestibule 118 may be shorter or longer than that in further embodiments. The vestibule may further include a flexible curtain 172 adjacent the edge of transport end 104. Together with the platform 114, the three walls and curtain define an enclosure which seal against the door opening of transport conveyor 106 when the conveyor backs against the vestibule. The flexible curtain 172 provides a tight seal between the vestibule and the open transport conveyor.

The vestibule 118 may further include a dock leveler 174 which tilts upward or downward so that the edge of the dock leveler 174 adjacent the transport conveyor 106 is at the height of the transport conveyor. Dock levelers are known, and may for example be powered by a hydraulic system that raises and lowers a ramp of the dock leveler.

The operator has little or no sight as he is driving the pallets into the transport conveyor. Thus, vestibule 118 may further include swing doors 176 that angle in from the sides of the vestibule to funnel and properly align the pallets as the dock forklift 152 delivers the pallets into the transport conveyor 106.

After the dock forklift 152 offloads the pallets into the transport conveyor, the dock forklift 152 may back straight out, rotate on the forklift turntable 120, and acquire the next pair of pallets. The process may then be repeated until all pallets are loaded into the transport conveyor. While the above embodiments describe use of a dock forklift 152, it is understood that other vehicles capable of lifting and transporting palletized product may be used on transition dock 100 in place of forklift 152. In such embodiments, turntable 120 may still be referred to as a forklift turntable, even though it is rotating another type of vehicle.

The embodiments described above illustrate how portable transition dock 100 may be used to load pallets onto a transport conveyor 106. It is understood that the embodiments described above may similarly be used to offload a transport conveyor 106. The dock forklift 152 may acquire pallets from loading conveyor 108, for example two at a time, reposition them if desired by the pallet shift and rotate assembly 122, and then deliver the pallets to the loading end 102. At the loading end 102, the dock forklift 152 can deliver the pallets into a field harvesting truck 108b or leave them at loading end 102 for acquisition by a field forklift 108a. In a further embodiment pallets may be loaded onto the transition dock 100 from a transport conveyor 106 or loading conveyor 108 and stored on the dock 100.

In summary, the present technology relates to a system for initiating a cold chain for produce at a site where the produce is harvested, comprising: a transition dock configured for operation at the site where the produce is harvested, the transition dock including: a platform for receiving pallets of the produce from a loading conveyor and/or a transport conveyor; and a locomotion system on which the platform is mounted, the locomotion system enabling the transition dock to travel to and from the site where the produce is harvested.

In a further example, the present technology relates to a transition dock, comprising: a platform for transferring palletized product between a loading conveyor and a transport conveyor; and a locomotion system on which the platform is mounted, the locomotion system providing portability to the transition dock.

In another example, the present technology relates to a transition dock, comprising: a platform for receiving palletized product from a loading conveyor and/or a transport conveyor; a turntable in the platform for rotating equipment that transports the palletized product from a first end of the platform to a second end of the platform opposite the first end; and a locomotion system including wheels for transporting the transition dock from a first location to a second location.

In a further example, the present technology relates to a transition dock, comprising: a platform for receiving palletized product from a loading conveyor and/or a transport conveyor; and a locomotion system including a flip axle assembly, the flip axle assembly configured to move between a deployed position where it can receive palletized product as part of the platform, and a transport position where it may be connected to a vehicle for transporting the transition dock over a highway.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A transition dock, comprising:
   a platform configured for receiving palletized product at a loading position, and the platform further configured to support a rolling pallet conveyor that transports the palletized product along the platform from the loading position to a transport position where the product may be transferred to a transport vehicle for transporting the palletized product; and
   a turntable positioned between the loading position and transport position, the turntable mounted to pivot within the platform, the turntable configured to receive the rolling pallet conveyor and configured to rotate the rolling pallet conveyor 180° as the pallet conveyor delivers the palletized product from the loading position to the transport position;
   wherein the transition dock is DOT and FMVSS legal for travel over a highway.

2. The transition dock recited in claim 1, further comprising a locomotion system on which the platform is mounted, the locomotion system enabling the transition dock to travel to and from the site where the palletized product is harvested.

3. The transition dock recited in claim 1, wherein the transport position of the transition dock includes an enclosed vestibule for mating with a transport conveyor, the vestibule including a thermal barrier for maintaining a controlled environment within the transport conveyor while the palletized product is loaded into the transport conveyor.

4. The transition dock recited in claim 1, wherein the product is produce.

5. The transition dock recited in claim 1, wherein the rolling conveyer is a fork lift.

6. The transition dock recited in claim 1, wherein the turntable includes at least one mechanical or electrical safeguard to prevent rotation of the turntable unless the equipment is properly positioned thereon.

7. A transition dock, comprising:
   a platform configured for receiving palletized product at a loading position, and the platform further configured to support a rolling pallet conveyor that transports the palletized product along the platform from the loading position to a transport position where the product may be transferred to a transport vehicle for transporting the palletized product; and
   a turntable positioned between the loading position and transport position, the turntable mounted to pivot within the platform, the turntable configured to receive the rolling pallet conveyor and configured to rotate the rolling pallet conveyor 180° as the pallet conveyor delivers the palletized product from the loading position to the transport position;
   wherein the turntable comprises a pallet conveyor turntable, the transition dock further comprising a pair of pallet turntables configured to receive a pair of pallets carrying the palletized product, the pallet turntables configured to separate and/or rotate the pallets for positioning within the transport vehicle.

8. A transition dock, comprising:

a platform configured for receiving palletized product at a loading position, and the platform further configured to support a rolling pallet conveyor that transports the palletized product along the platform from the loading position to a transport position where the product may be transferred to a transport vehicle for transporting the palletized product; and a turntable positioned between the loading position and transport position, the turntable mounted to pivot within the platform, the turntable configured to receive the rolling pallet conveyor and configured to rotate the rolling pallet conveyor 180° as the pallet conveyor delivers the palletized product from the loading position to the transport position;

a locomotion system including a flip axle assembly, the flip axle assembly configured to move between a deployed position where it can receive palletized product as part of the platform, and a transport position where it may be connected to a vehicle for transporting the transition dock over a highway, the flip axle assembly including a pair of legs, a first leg including an upper planar surface and a lower surface on which is mounted an axle having wheels and a drive system, the wheels engaging the ground when the flip axle assembly is in the deployed position, wherein the wheels are spaced from the ground when the flip axle assembly is in the transport position, and wherein the second leg includes a coupling for mating with the vehicle for transporting the transition dock over the highway.

9. The transition dock recited in claim 8, wherein the wheels and drive system are configured to propel the transition dock around a worksite where the transition dock is located.

10. The transition dock recited in claim 8, wherein the product is produce and the wheels and drive system are configured to propel the transition dock around a site where the produce is harvested.

11. The transition dock recited in claim 8, wherein the coupling is a fifth wheel.

12. A transition dock, comprising:

a platform with no fixed conveyor, the platform configured for receiving palletized product at a loading position, and the platform further configured to support a rolling pallet conveyor that transports the palletized product along the platform from the loading position to a transport position where the product may be transferred to a transport vehicle for transporting the palletized product; and an enclosed vestibule at the loading position of the transition dock, the vestibule including a thermal barrier for maintaining a controlled environment within the transport vehicle while the palletized product is loaded into the transport vehicle.

13. The transition dock recited in claim 12, further comprising:

a locomotion system including a flip axle assembly, the flip axle assembly configured to move between a deployed position where it can receive palletized product as part of the platform, and a transport position where it may be connected to a vehicle for transporting the transition dock over a highway, the flip axle assembly including a pair of legs, a first leg including an upper planar surface and a lower surface on which is mounted an axle having wheels and a drive system, the wheels engaging the ground when the flip axle assembly is in the deployed position, wherein the wheels are spaced from the ground when the flip axle assembly is in the transport position, and wherein the second leg includes a coupling for mating with the vehicle for transporting the transition dock over the highway.

14. The transition dock recited in claim 13, further comprising a turntable positioned between the loading position and transport position, the turntable mounted to pivot within the platform, the turntable capable of rotating the pallet conveyor 180° as the pallet conveyor delivers the palletized product from the loading position to the transport position.

15. The transition dock recited in claim 14, wherein the turntable comprises a pallet conveyor turntable, the transition dock further comprising a pair of pallet turntables for receiving a pair of pallets carrying the palletized product, the pallet turntables configured to separate and/or rotate the pallets for positioning within the transport vehicle.

16. The transition dock recited in claim 12, further comprising a locomotion system on which the platform is mounted, the locomotion system enabling the transition dock to travel to and from the site where the palletized product is harvested.

17. The transition dock recited in claim 16, wherein the transition dock including the locomotion system is DOT and FMVSS legal for travel over a highway.

* * * * *